Dec. 30, 1930.  E. G. STRECKFUSS  1,787,288
MEAT SLICER
Filed March 20, 1926   6 Sheets-Sheet 1
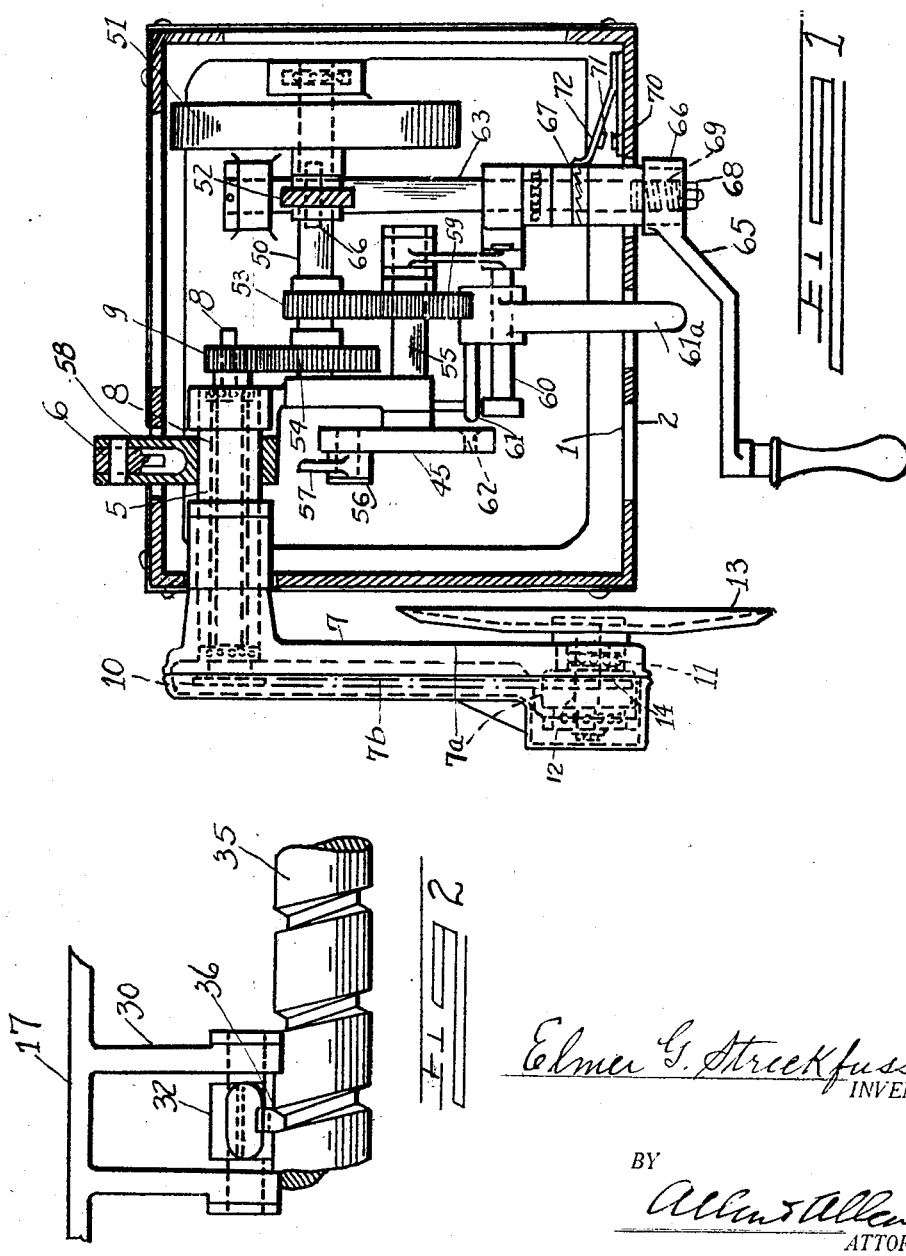
Elmer G. Streckfuss
INVENTOR.
BY
Allen & Allen
ATTORNEY.

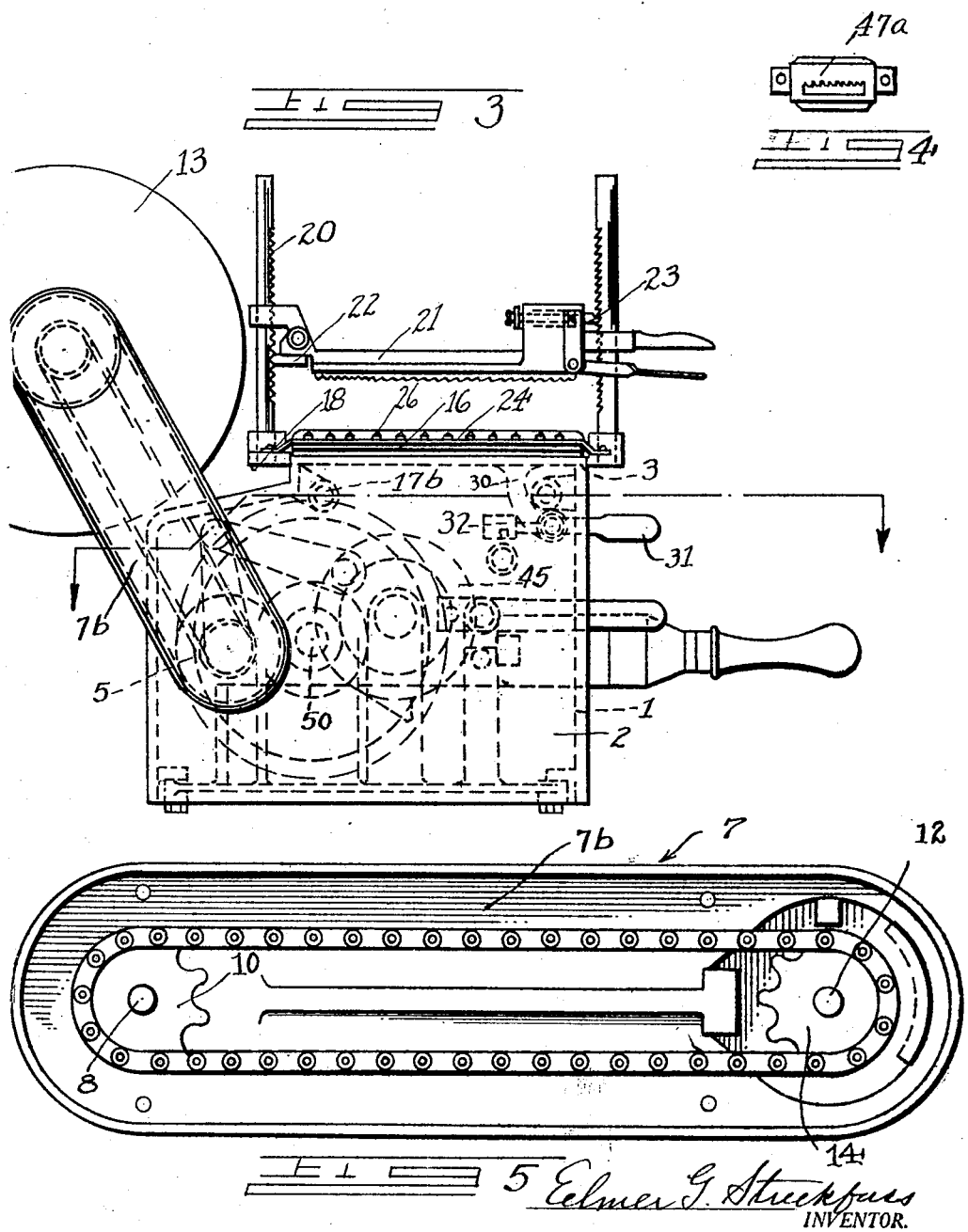

Dec. 30, 1930.  E. G. STRECKFUSS  1,787,288
MEAT SLICER
Filed March 20, 1926    6 Sheets-Sheet 3

Elmer G. Streckfuss
INVENTOR.

BY

ATTORNEY.

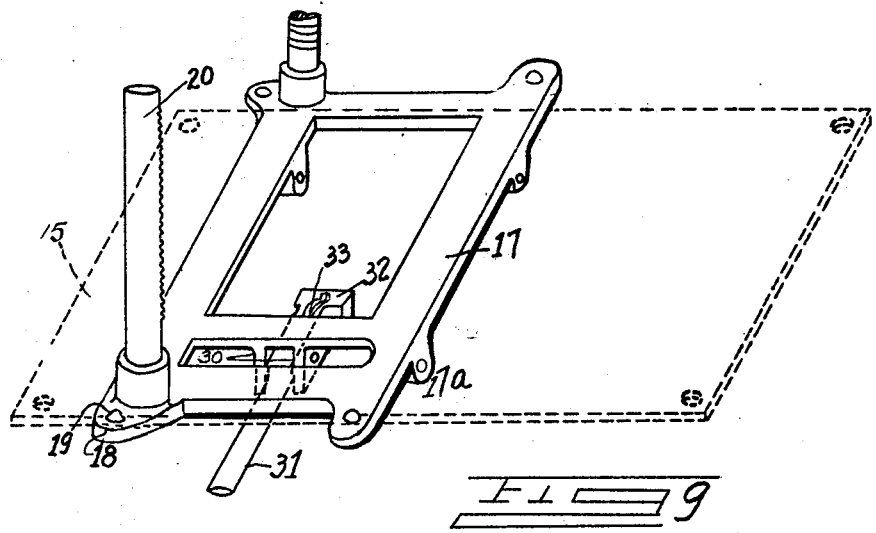
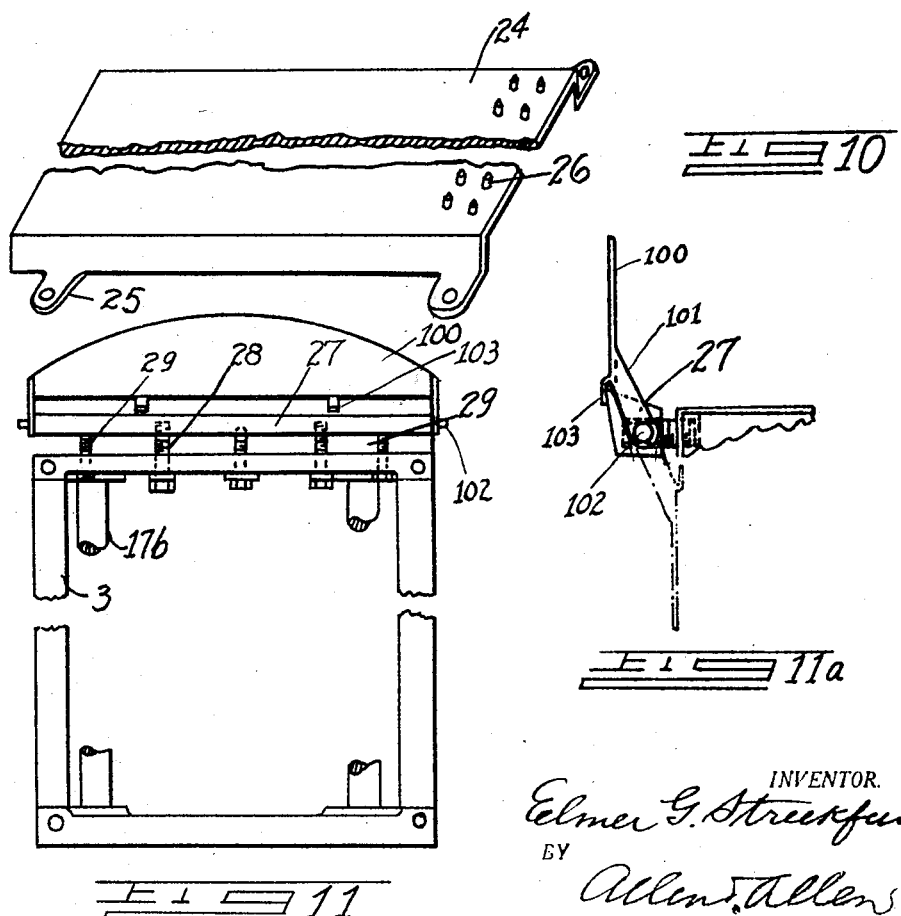

Dec. 30, 1930.  E. G. STRECKFUSS  1,787,288
MEAT SLICER
Filed March 20, 1926   6 Sheets-Sheet 5
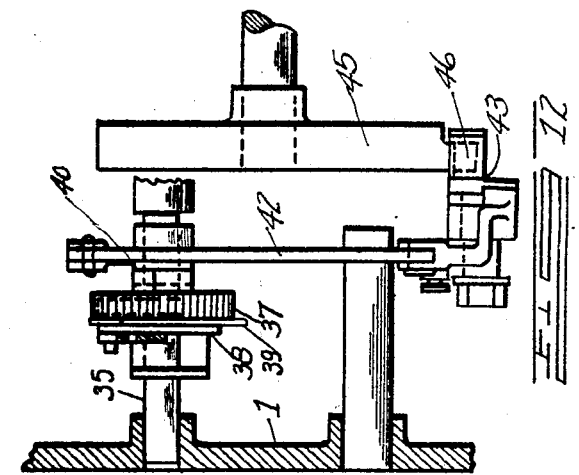
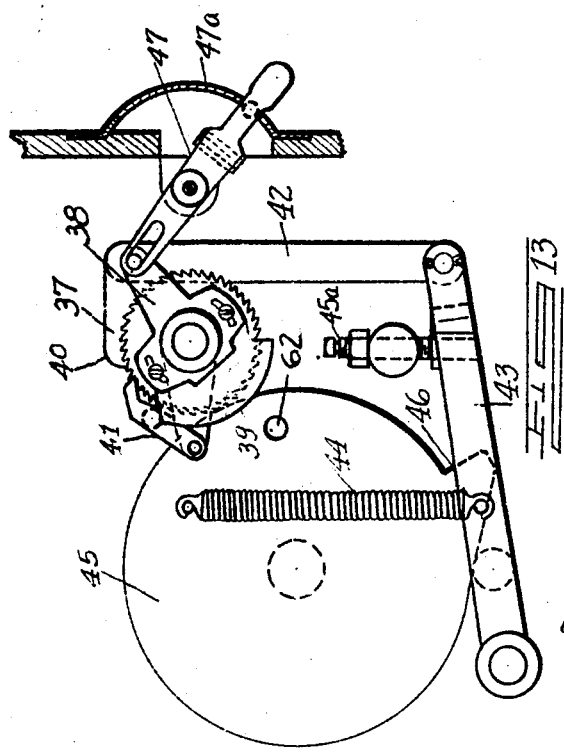
INVENTOR.
Elmer G. Streckfuss
by Allen & Allen
ATTORNEYS

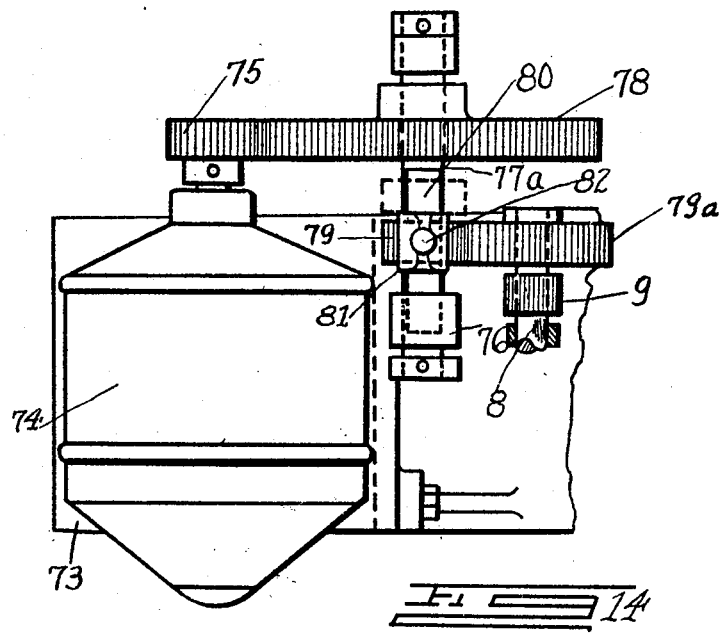
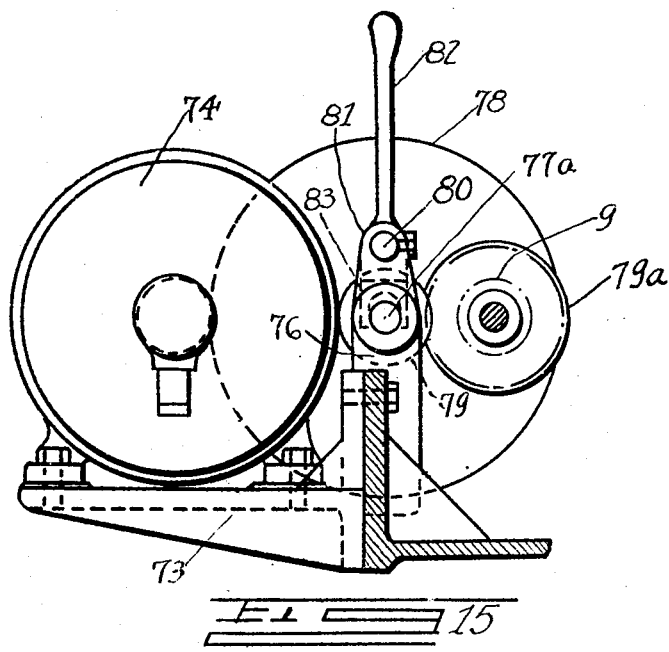

Patented Dec. 30, 1930

1,787,288

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

MEAT SLICER

Application filed March 20, 1926. Serial No. 96,296.

My invention relates to machines for the slicing of meat of the type in which the holder for the meat is fed toward the knife by a measured movement, and the knife and meat holder have a relative movement which results in a passing of the knife across the meat.

In particular my machines involves the use of a swinging revolving knife, and a meat supporting table which moves in but one direction.

It is the object of my invention to provide a simple mode of operation for machines of the type noted in which among other things, the fly wheel is mounted within the machine so as to permit a ready adaptation of a single type of mechanism to manual or electrical operation without leaving an exposed fly wheel, as in other machines with which I am familiar.

It is my object to provide for a mounting of the meat on the machine, in a manner which permits of easy removal of parts that come in contact with the meat, without requiring a disconnecting of any of the mechanical parts of the device except those to be cleaned. In this connection it is also my object to provide a plate for the meat which moves across the main cover plate of the mechanism, so that the meat is not forced down on any fixed member over which it must slide, and thus is kept in good condition, and remains in proper clamped position after it has once been properly arranged.

Another object is to provide an adjustable fixed knife or shear blade, whereby a true shearing cut can be obtained at the base of the meat.

Another object is to provide an interlocking mechanism, requiring that the swinging arm on which the knife revolves must be in a position swung away from the front of the machine and positively locked in such position before it is possible to throw out the gearing that serves to swing the arm. This interlock results in safety against chance injury during the act of sharpening the knife, which can then be effected by revolving the main feed handle.

I have provided a simple device for sharpening the knife when so revolved.

I have provided a simple mechanism in connection with the meat table feed whereby the table can be easily shifted back by hand, and will come to a stop at a predetermined point, i. e., before it will move into the path of the knife.

Generally speaking I have arranged the mechanism of my machine and for the housing thereof, so as to obtain an easy motion, simple structure, and a complete housing of all movable parts except such as are required in order for the machine to function.

I have accomplished the objects and advantages heretofore noted by that certain construction and arrangement of parts to be hereinafter more specifically pointed out and claimed.

In the drawings:

Figure 1 is a plan view of the operating mechanism except for the table feed, and slice adjustment.

Figure 2 is a detail of the follower for the table feed.

Figure 3 is an end elevation of the machine.

Figure 4 is a detail of the slice adjuster rack.

Figure 5 is a detail of the knife arm cover.

Figure 9 is a perspective of the feed table frame.

Figure 10 is a perspective of the feed table plate.

Figure 11 is a plan view of the top of the machine frame showing the adjustable shear blade.

Figure 11a is a projection from Figure 11 showing the blade.

Figure 12 is a detail front elevation of the slice adjuster.

Figure 13 is a side elevation of the slice adjuster.

Figure 14 is a plan view of the motor drive attachment.

Figure 15 is a side elevation of the said attachment.

Figure 6:
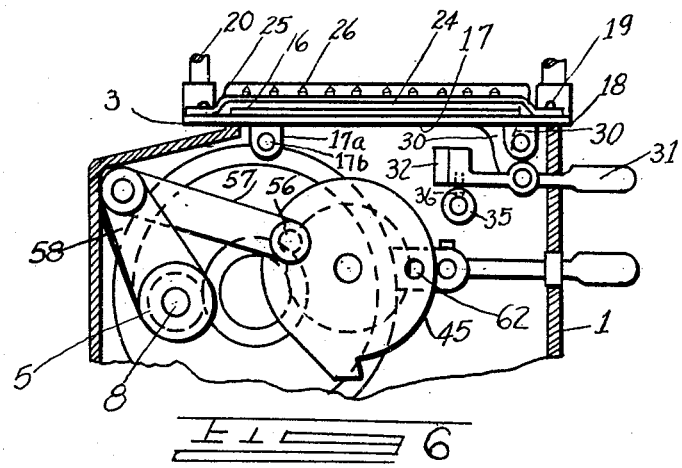
Figure 6 is an elevation of the arm rocking drive, showing the machine casing in cross section.
Figure 7:
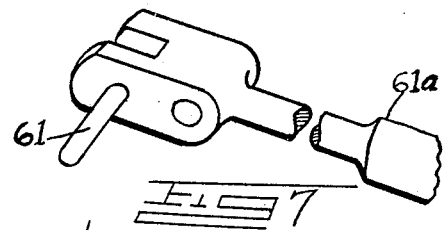
Figure 7 is a perspective of the gear shifting handle.
Figure 8:
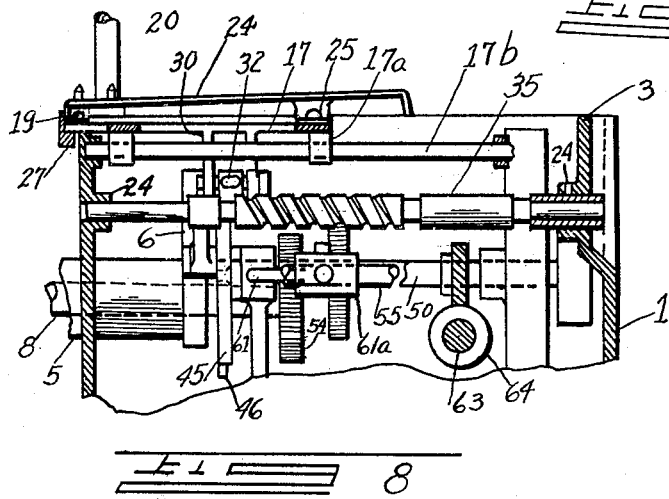
Figure 8 is an elevation of the table feed with the machine casing in longitudinal section.

I have indicated the main frame of the machine by the numeral 1, and it consists of a suitable cast body, with integral arms and bosses, the same being covered at the sides and bottom, by preference with white enameled plates 2. The top of the frame I have indicated at 3 (Figure 11).

A sleeve 5 (Figure 1) is arranged in a suitable bearing toward one rear corner of the machine, and at the side thereof, which sleeve is connected at its inner side with the crank 6, and outside of the machine is formed with an integral arm 7, with a cup-like outer end 7a. Secured over the arm is a metal hood 7b (Figure 5) which forms an enclosed body with the arm for the blade drive. Within the sleeve is a shaft 8 having on its inner end beyond the sleeve, a gear 9, and on its outer end within the arm and its casing, a sprocket 10. Set in the outer end of the arm is a bearing 11, in which is the shaft 12 of the blade 13. A sprocket on this shaft as at 14 is connected with the sprocket 10 by means of a chain.

In operation the arm is rocked down across the end of the machine frame, and back again upwardly and rearwardly, and the knife revolved at the same time, there being means provided to revolve the shaft 8 and rock the sleeve 5, through the medium of the crank.

The mechanism so far described is an adaptation from old machines and does not constitute invention.

Referring to Figures 9, 10 and 11, it will be noted that the top 3 of the frame has holes in the corners in which are set screws for securing thereover a plate 15.

Arranged to extend across the machine frame just beneath the top are a pair of bars or rods 17b. The meat carrying frame is formed with the table frame portion 17, having bosses 17a thereon, which engage over the rods 17b, so that the table frame slides to and fro across the machine. This frame lies across the top edges of the sides of the main frame, whereas the ends of the main frame are extended somewhat further up. The result of this is that the plate 15 covers the table frame and excludes it from view except for the portions which overhang the sides of the main frame. These portions are formed as ears 18 which have studs 19, extending up therefrom. Also the posts 20 of the meat clamp extend up from two of these ears.

The meat clamp bar 21 (Figure 3) may be of desired type, and is shown as having a fixed toothed member 22 to engage one of the posts and a shiftable tooth 23 to engage the other of the posts.

The meat plate itself is arranged with a top 24, and bent down ears 25, which are perforated to engage over the studs 19. A series of pins 26 are arranged across the plate to engage the meat beneath the clamp bar, which is also toothed.

The result of this structure is that the meat plate is held removably in place, and elevated by the ears 25 sufficiently to clear the main cover plate 15 and lie above it. The meat is carried along across the machine by means of the plate against which it is clamped so that no friction is applied to the meat where it lies over the main cover plate.

To clean the several plates, the meat plate can be lifted off, and the main cover plate is then fully exposed for cleaning. There is no communication into the inside of the machine from the meat exposed portions, and to get at the inside of the machine the plate 15 is removed, without detaching any other mechanism.

This arrangement makes for great economy in keeping the machine clean, and improves the feed of the meat, and keeps the meat in a better clamped position, and less frictionally torn during the steps of advance toward the knife. It also makes the machine easier to operate, and easy to inspect and repair.

The shear knife, which co-operates with the main blade on the rocking arm, is provided with a special adjustment, to permit of getting a proper shearing cut.

I have illustrated as the preferred embodiment, a shear blade 27, held in place on the swinging arm end of the machine by means of studs 28, passing into the blade from the main frame. Set screws 29 are also used to adjust to a fine angular position, the said shear blade, as will be evident from an inspection of Figure 11, and the blade bears against a central fulcrum screw 29a.

To set the knife, the main bolts are released, the set screws arranged to give the desired shearing angle, and the bolts then tightened down. There is enough play in the parts to give whatever slight angle is found best for cutting.

When the knife becomes worn, it can be projected outwardly from the frame, and the mechanism can be kept in condition such that the revolving blade just clears the shear blade, and cuts off each meat slice cleanly at the bottom edge due to an angularity of the shear blade with relation to the knife, which is very slight and leaves a little more space at the one end than the other.

Prior to a description of the operating mechanisms, it will be noted that to slice the meat, a piece is set on the meat table and clamped there, and the machine driven to rock and revolve the cutting knife, and feed the meat table frame toward the knife and shear blade end of the machine by graduated steps, depending upon the desired thickness of slice.

For moving the meat plate and clamp devices across the top of the machine, there are two lugs 30, depending from the frame of the meat plate (see Figures 9 and 2) in which is pivoted a lever 31, which has a weighted end 32, and also, if desired a spring 33 may be used to press the inner end down. The outer end of the lever is exposed for manipulation.

Within the machine is mounted in suitable bosses 24, a shaft 35, the intermediate portion of which is formed as a screw.

The shaft is revolved by small steps, and the inner end of the lever is equipped with a lug or stud 36 which engages in the threads of the screw. Thus when the shaft is revolved the screw will feed the lever along, and the lever being carried by the meat plate frame will move the meat plate. To return the plate the handle is tipped down to raise the pin from the screw and moved back. The screw terminates in a circular groove to stop the advance of the meat plate without stopping the machine.

To revolve the shaft it is equipped with a mechanism which of itself is not novel broadly speaking. A ratchet wheel 37 (Figure 13) is mounted fast over the shaft. Mounted loose over the shaft is a plate 38, having a flange 39 which overlies the ratchet. Mounted on the other side of the ratchet, is another loosely mounted pawl plate 40, which carries a spring pawl 41. The pawl plate or lever is connected to a link 42, on a spring yoke lever 43 in the base of the machine. This lever has a spring 44, pulling it upwardly, and an abutment screw 45ª which limits its upward position.

A disk 45 having a lug 46 thereon, contacts with the lever, once in each revolution, and strikes it down, which rocks the pawl lever so that the pawl swings clockwise over the ratchet. The shield holds the pawl from contact with the ratchet, so as to limit the number of teeth which can be traversed by the pawl.

As in the usual typewriter line spacing structure, the adjustment of the ratchet covering plate controls the amount of revolution of the ratchet, at each full throw of the pawl lever.

In order to adjust the amount of feed of the meat plate at each complete slicing operation, or the method of adjusting the thickness of slice, is to extend a lever 47 through the casing of the machine where it lies in a slotted piece 47a suitably calibrated along the sides, and notched to engage the lever and hold it in place (Figure 4).

The inner end of the lever is secured to the guard plate and rocks it to the position indicated on the scale, for a plurality of different feeds.

As stated mechanism operating on this principle are old in meat slicers. As will be noted, the same drive used to operate the pawl also serves to rock the slicing blade arm, thus synchronizing the feed with the movement of the arm.

In order to make secure that the blade arm will lie away from the operator in a fixed position, when the blade is being revolved without the blade arm being moved, as during sharpening, the clutch element for the blade arm drive engages the disk 45 that operates the feed and the blade arm. This will be pointed out in detail in the further description.

Referring to Figure 1 it will be noted that in the rear of the machine away from the blade end, is mounted a shaft 50 which carries the fly wheel 51 of the machine. This shaft has a spiral gear 52 thereon, by which it is driven when hand operated. It has also a gear 53 through medium of which the slice adjuster and blade arm are driven, and a gear 54, which meshes with the gear 9 on the blade driving shaft heretofore noted.

A shaft 55 is arranged on suitable bearings in the lower central part of the machine. This shaft bears on one end of the disk 45. This disk has an arm 56 connected eccentrically thereof, which arm is linked by the link 57, with an arm 58 on the outer sleeve 5 of the blade arm operating structure, heretofore noted. By a single revolution of the shaft 55, the arm and link acting as a crank, rocks the sleeve 5 to and fro once.

In order to drive the shaft 55, there is splined thereon so as to be slidable, a gear 59, which when moved to the right, will engage the gear 53 on the fly wheel shaft. The movement of the gear to the left will free the blade arm and slice adjuster mechanism from operation.

The movement of the sliding gear to clutched and unclutched position is accomplished by means of a lever on fork 61a, that slides on an intermediate bar 60, supported near the front of the machine base. The forked end of this lever carries a pin 61, which engages in a hole 62 in the disk 45, heretofore identified with the arm and meat table feed mechanisms.

From the structure last noted, it follows, that the operation of unclutching the blade arm, and meat table feed, requires a location of the disk 45, with the hole 62 therein in position to receive the pin 61. Thus it is arranged that the blade arm slants to the extreme of its movement away from the operator when the arm is unclutched.

In sharpening the mechanism, or unclutching it so that a careless pressure on the crank will not start the machine into operation, I have thus secured that the blade will not be in a position of danger to one in front of the machine. Also during sharpening, the arm is held so that it cannot be moved at all even if external force is applied thereto.

To drive the fly wheel shaft I provide for two mechanisms, a hand drive and a motor drive, or other power drive. I have illustrated a structure where an electric motor and a manual handle may be alternatively used.

The handle drive is formed by a shaft 63 journaled in the right end of the machine, which has a worm 64 thereon that meshes constantly with the worm 52 on the fly wheel shaft.

A manual handle 65, having a sleeve portion 66, that fits over the outer end of the shaft 63 engages the shaft to drive it by a toothed clutch element on the sleeve and shaft respectively as indicated at 67. A nut 68 on the end of the shaft 63 holds a spring 69 under tension. This spring engages in a cup in the outer end of the handle sleeve.

By this means the handle will be forced out of mesh during its operation in case of an unexpected stoppage of some part of the machine.

In order to assure that the motor cannot be operated when the handle is in use, I provide a circuit breaker for the motor circuit, in the form of a pair of contacts 70 and 71 (Figure 1) one of which is on a spring arm 72. This arm rests against the sleeve of the feed handle, which thus holds it out of contacting position leaving the motor open. The removal of the handle sleeve will permit the circuit to close.

The fact that the fly wheel is housed within the machine permits of safe motor operation, without a moving part exposed at the front of the machine, and in addition gives a neat appearance to the machine, and locates the fly wheel center fairly in line with the shaft and sleeve of the knife operating mechanisms, instead of at right angles thereto, as would be required if the fly wheel were part of the operating handle as is usual practice.

When the device is used as a motor driven element I provide a bracket 73, which is secured to the back of the machine and on which the motor 74 is placed. The motor has a gear 75 on the end of the rotor shaft. (Figures 14 and 15.)

There is an opening left in the back plate of the machine so that the bracket extends into the machine, as at 76 and 77. The bracket portions have journals which support the short shaft 77a on which is a large gear 78 and a small splined gear 79. The large gear meshes with the motor gear of the motor and the small gear is movable to positions in and out of mesh with the gear 79a on the end of the knife blade driving shaft of the machine.

A short rod 80 is held in the bracket portion 76, on which slides a collar or sleeve 81, with a handle 82 extending vertically therefrom.

The sleeve has forked depending portions 83, which engage over the shaft 77, on each side of the splined gear 79. Thus by moving the handle 82, the motor may be connected to the knife blade drive shaft to drive it. The gear 9 will in turn drive not only the knife blade shaft, but also the fly wheel shaft and thus the other mechanisms of the structure, as will be evident from the foregoing description.

I have not attempted to describe in this application various accessories to the use of my machine, but will note that because of the use of the rocking blade arm principle I am enabled to provide a better meat table than in other machines, and that by my drive I can provide for alternative motor or hand operation, or eliminate the motor altogether by merely removing the bracket. The safety devices noted, and the various instrumentalities could be provided by alternative mechanical structures without departing from the spirit of my invention.

One device I have shown in connection with the shear blade of the machine, which is a very important feature of the mechanism. This is a plate which provides a flat abutment in substantially the plane of cut of the revolving knife, against which a piece of meat may be pressed to get a surface for operation upon by the knife which is in the plane of the line of cut. This is of importance where it is desired to cut slices of meat from a piece which has already been partially sliced, and in which there should be no waste in getting off a new batch of slices.

For this purpose I provide a plate shown in Figures 11 and 11a at 100, which is supported on arms 101. These arms are pivoted on studs 102 extending laterally from the shear blade, as a matter of convenience, since adjustment of the blade adjusts the position of the arms. In Figure 11 the plate is shown partially lifted, and is shown in its position of use in full lines in Figure 11a, and in its position out of use in dotted lines. The plate has lips 103 thereon which when the plate is raised manually will engage the shear blade, and hold the plate in a position in the plane of the line of cut of the revolving blade. When released from the hand, the plate will drop down to a position beneath the shear blade, thus out of line with the slicing blade so as not to accidentally strike this blade. I have shown no latch to hold the blade in its lower position, although it could be provided.

In taking a piece of already sliced meat, the remainder is laid upon the meat table and the plate lifted and held. The meat is then pushed or crowded up against the plate until its face lies even with it, whereupon the meat clamp is brought down to hold the meat in this position. The machine is then operated resulting in a good even slice at the first cut.

Having thus described my invention, what I claim as new and desire to secure by Letters Patent, is:—

1. In a meat slicing machine, a meat advancing device having a meat clamp thereon, a revolving knife having a path of movement to slice the meat, and means movable to a position in coincidence with the plane of cut of the revolving knife and arranged as an abutment against which meat may be crowded to give it a surface prepared for a slicing operation of the knife, said means formed as a hinged plate, and means for so hinging the plate that it moves to position by gravity out of the plane of cut of the knife.

2. In a meat slicing machine, a meat advancing device to move the meat step by step in one line, a revolving knife, means for moving the knife across the line of advance of the first mentioned device, and an abutment plate associated with said machine and movable into and out of a position of alignment with the knife to provide a surface in a plane aligned to the plane of cut of the knife, for the purpose described.

3. In a meat slicing device the combination with a frame, a shear blade associated therewith, a knife movable across the shear blade, means for advancing meat step by step across the shear blade at right angles to the knife, and a plate hinged to fall down beneath the shear blade, and provided with means to limit its upper movement to one of presenting an abutment erected in the path of the knife and providing a surface against which a piece of meat is to be crowded to provide a surface prepared for slicing.

4. In a meat slicing machine, a frame having operating mechanism therein, a knife carried on a swinging arm, and a shear blade on the frame, said blade being adjustable to and from the frame, and adjustable angularly with relation to the frame.

5. In a meat slicing machine, a frame having operating mechanism therein, a knife carried on a swinging arm, and a shear blade mounted upon bolts on the said frame, and set screws engaging said shear blade and holding it in adjusted positions with relation to the bolts in the frame.

6. In a meat slicing machine, a frame, a sleeve rocking in said frame, a rotated shaft within said sleeve, an arm formed integral with said sleeve, and having a cover plate secured thereto to form a hollow body, journals at the end of the arm and a rotary knife supported by said journals, and chain and sprockets within the hollow body, connecting the shaft and the blade.

7. In a meat slicing machine, a frame, a sleeve rocking in said frame, a rotated shaft within said sleeve, an arm formed integral with said sleeve, and having a cup-shaped body at its extremity, a cover enclosing the arm and body and forming a hollow chamber, a knife blade supported in journals in said cup-shaped body, and sprockets and a chain intermediate the shaft and the knife to rotate the knife.

8. In a meat slicing machine the combination of a rotary shaft and a rocking arm, a blade at the end of the arm driven by the shaft, mechanism to rotate the shaft and rock the arm, and clutching means and a driving mechanism coupled to drive the shaft at all times, said clutching means arranged to couple and uncouple the mechanism to rock the arm from the driving mechanism without uncoupling the shaft and means for holding the arm against movement interlocked with the clutch.

9. In a meat slicing machine, a rotary shaft and a rocking arm, a cover, a knife, on the arm and means for rotating the knife, mechanism including a clutch for rocking the arm, and interconnection between the clutch and the mechanism for rocking the arm arranged to engage automatically and hold said mechanism in fixed position when the said mechanism is unclutched, said engagement being set so that the arm will, under such a condition, be in position inclined away from the operator's side of the machine.

10. In a meat slicing machine having a frame, the combination of an operating shaft, a fly wheel within the frame, a handle for the operating shaft outside of the frame, a knife having a shaft for rotating the same, a rocking arm for moving the knife, and a drive from the operating shaft to the fly wheel shaft and the fly wheel shaft to the knife rotating shaft and the rocking arm, the axis of the fly wheel shaft being parallel with the axis of the knife rotating shaft and rocking arm.

11. In a meat slicing machine the combination with a rotary shaft, a rocking arm, and a blade at the end of the arm driven by the shaft, of mechanism to rotate the shaft and rock the arm, and power transmission means for coupling the mechanism to the arm, and means requiring the locking of the arm upon uncoupling of said mechanism.

12. In a meat slicing machine the combination with a rocking arm, and a knife carried thereby, of power means for rocking the arm, including a transmission means for coupling and uncoupling the power, and means requiring the locking of the arm upon uncoupling of said mechanism.

13. In a meat slicing machine having a meat advancing means, and a knife movable across the path of said advancing means, the combination of means for moving the knife in said path, and driving means including a transmission mechanism for coupling and uncoupling the knife, and means requiring a locking of the knife in position away from the table, upon uncoupling said transmission means.

14. In a meat slicing machine having a meat advancing means, and a knife movable across the path of the said advancing means, the combination of means for moving the knife in said path, driving means for said means including a transmission mechanism for coupling and uncoupling the same, said means requiring a locking of the advancing means and the knife moving means upon uncoupling of said transmission mechanism.

15. In a meat slicing machine, having a meat advancing means, a knife movable cross the path of said means, and a rocking arm on which said knife is carried, the combination of a rotary element, power means including a coupling and uncoupling mechanism for revolving said element, eccentric connections from the element to the arm for rocking it, and said coupling mechanism having a member thereon to engage said element and hold it in locked position when said mechanism is moved to uncoupling position.

16. In a meat slicing machine, having a meat advancing means, a knife movable cross the path of said means, and a rocking arm on which said knife is carried the combination of a rotary element, power means including a coupling and uncoupling mechanism for revolving said element, eccentric connections from the element to the arm for rocking it, and said coupling mechanism having a member thereon to engage said element and hold it in locked position when said mechanism is moved to uncoupling position, and means driven by said rotary element to feed the meat advancing means in step by step movement.

17. In a machine of the character described the combination of a rotary tool, a shaft for revolving said tool, having gearing thereon, a power shaft within the machine having connections with a manual operating handle, a handle removable from said connections, and an electric motor having connection with the said gearing, and a switch held in circuit opening position by the said handle, when in driving relation with said connections.

18. In a machine of the character described the combination of a rotary tool, means for revolving the same, an operating handle detachably secured to said means, an electric motor connected to said means having a clutch in said connections, and switch means operated by the handle when in operative position for opening the circuit to the motor.

19. A transmission mechanism for meat slicers having a rocking arm, and a revolving knife thereon, the combination of a revolving shaft coupled to revolve a knife and rock it to and fro with the arm, a power shaft within the machine having a fly wheel thereon intermeshing gearing between said power shaft and the revolving shaft, shiftable gearing having connection when shifted with other gearing on said power shaft, and a shaft for said shiftable gearing having an oscillating mechanism thereon in engagement with the rocking arm, for rocking the same.

20. A transmission mechanism for meat slicers having a rocking arm and a revolving knife thereon, the combination of a revolving shaft coupled to revolve a knife and rock it to and fro with the arm, a power shaft within the machine having a fly wheel thereon, intermeshing gearing between said power shaft and the revolving shaft, shiftable gearing having connection when shifted with other gearing on said power shaft, and a shaft for said shiftable gearing having an oscillating mechanism thereon in engagement with the rocking arm, for rocking the same, said means comprising a disk with eccentric linked connection to the rocking arm, and a gear shifting member having means thereon adapted to engage and lock the disk when the gearing shifted thereby is out of mesh.

21. In a meat slicing machine the combination with a rotary knife, of a shaft for revolving said knife, transmission means for driving said shaft, including a fly wheel, and an operating handle for said transmission mechanism having a spring held clutch thereon for engaging the transmission mechanism, said clutch adapted to move out of driving relation upon stoppage within the machine.

ELMER G. STRECKFUSS.